United States Patent Office 3,331,451
Patented July 18, 1967

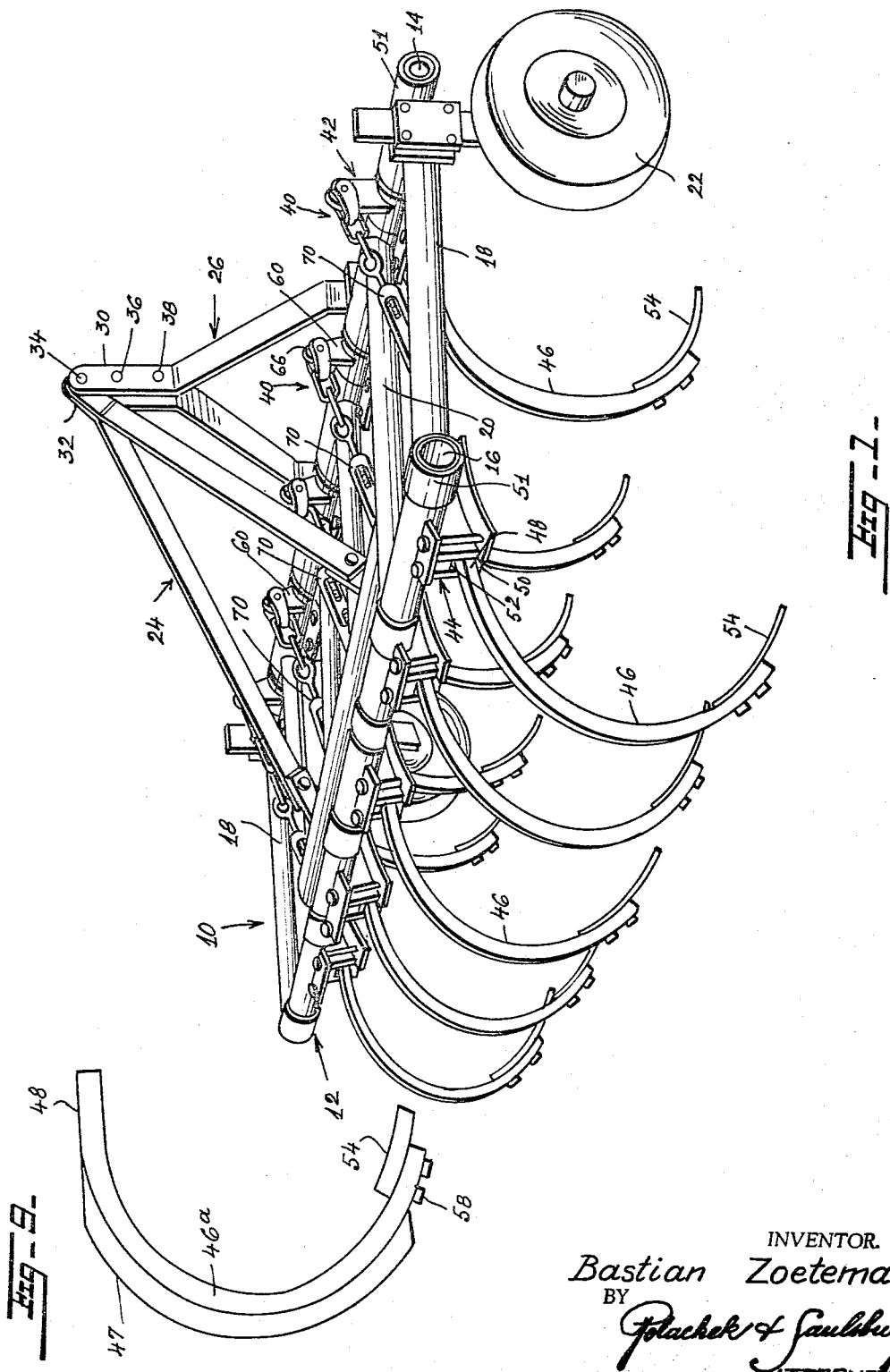

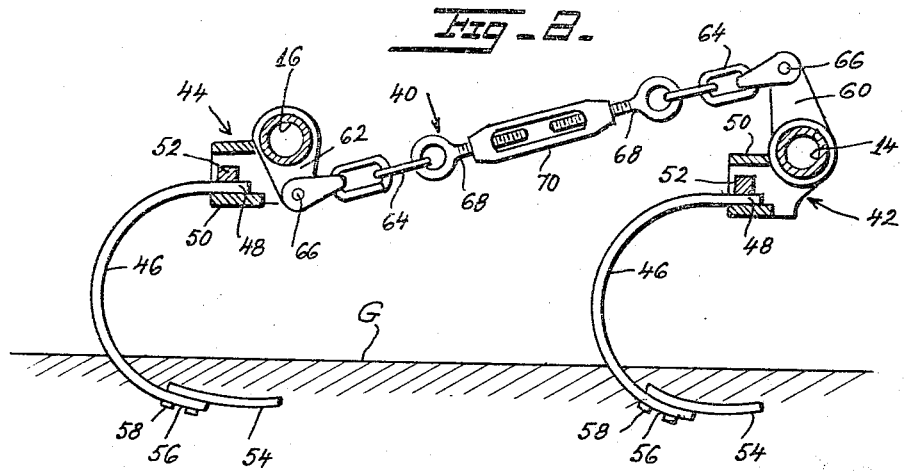
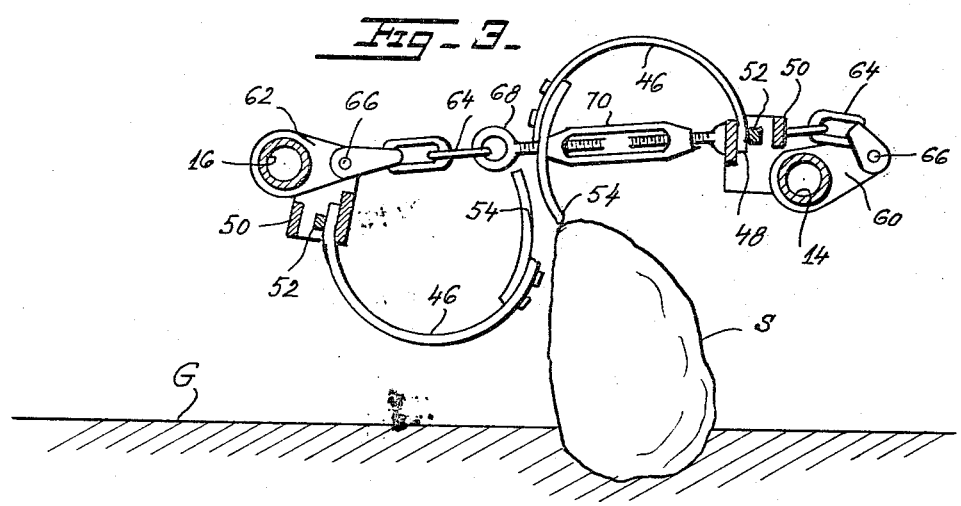
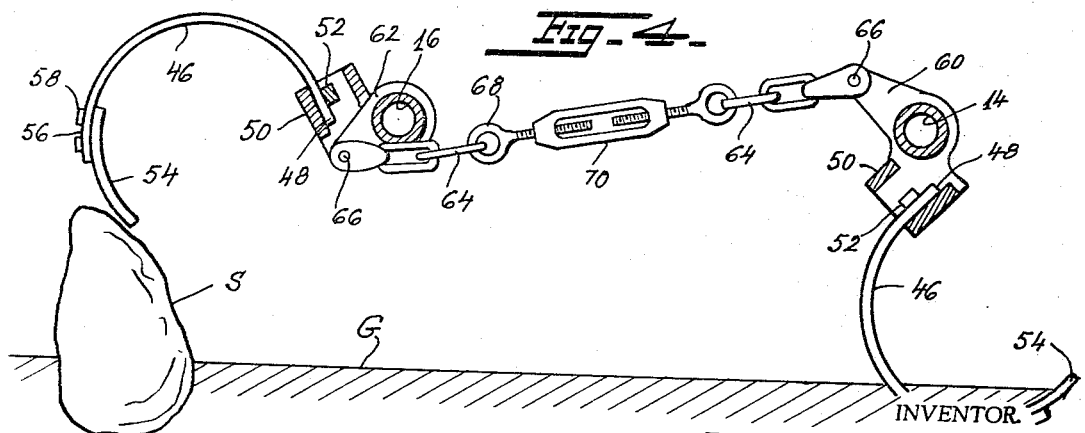

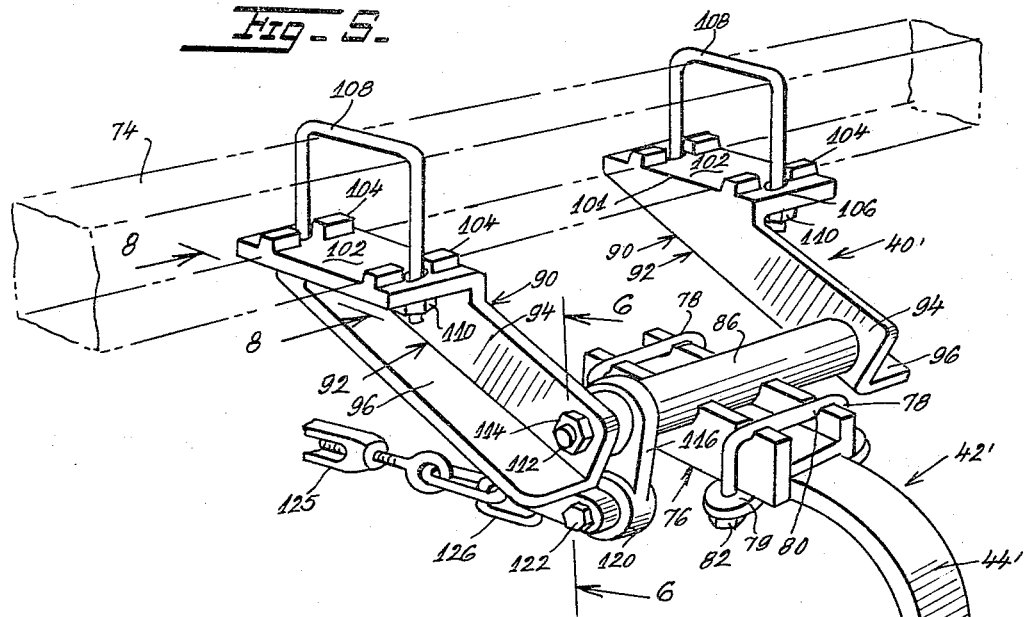

3,331,451
SUB TILLER
Bastian Zoeteman, Pincher Creek, Alberta, Canada
Filed Feb. 8, 1965, Ser. No. 430,829
4 Claims. (Cl. 172—657)

This invention relates to the art of husbandry and more particularly to new and useful improvements in a cultivator for tilling the soil.

A principal object of the present invention is to provide a cultivator with improved shank mountings whereby the shanks automatically clear obstacles yet quickly return to the ground and retain equilibrium.

Another object of the invention is to provide a cultivator having dual shanks with means for automatically shifting when the shanks strike an obstacle to a height to avoid the obstacle.

A further object is to provide a cultivator having dual shanks that work in unison without side draft, twisting or flexing backwardly.

Other objects of the invention are to provide a mounting for dual shanks that will decrease the chance of breakage of the shanks, that permits the cultivator to stay in the ground thus preventing skippage, that will provide less strain on the hydraulic system and that affords means for realigning a shovel if a shank should become sprung.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIG. 1 is a top perspective view of a cultivator embodying the invention.

FIG. 2 is a side elevational view of a dual shank assembly showing the shanks in normal penetration in the ground, under normal working conditions.

FIG. 3 is a similar view but showing the positions the parts automatically take when the forward shank strikes an obstacle.

FIG. 4 is a similar view but showing the positions the parts automatically take when pressure of the obstacle is removed.

FIG. 5 is a top perspective view of a modified form of shank and mounting, the frame of the cultivator being shown in dot-dash lines.

FIG. 6 is a vertical sectional view taken on the line 6—6 of FIG. 5.

FIG. 7 is a cross-sectional view taken on the line 7—7 of FIG. 6.

FIG. 8 is a sectional view taken on the line 8—8 of FIG. 5.

FIG. 9 is a side elevational view of a modified form of shank.

Referring now in detail to the various views of the drawings, wherein similar reference numerals are used to indicate similar parts throughout, in FIG. 1 a cultivator embodying the invention is illustrated and designated generally at 10. The cultivator 10 comprises a rectangular-shaped frame 12 composed of a front tube or pipe 14 and a rear tube or pipe 16 connected by end tubes or pipes 18, 18 and by intermediate spaced tubes or pipes 20. The front tube or pipe 14 is supported on a pair of wheels 22.

A pair of triangular-shaped subframes 24 and 26 providing a superstructure is mounted on the frame 12. Subframe 24 is fastened at its base to the rear tube 16 and is disposed at an acute angle to the frame 12, while subframe 26 is fastened at its base to the front tube 14 and is disposed vertically at right angles to the frame 12. The apex end 30 of subframe 26 overlaps the apex end 32 of subframe 24 and the overlapped ends are secured together by a rivet 34. A pair of other rivets 36, 38 extend across the apex end 30 of subframe 26 thereby constituting a three-point hitch for attachment to a tractor or the like.

In accordance with the invention, a series of shank assemblies 40 is mounted on the frame 12 in spaced relation. A shank assembly is shown in detail in FIG. 2. Each assembly includes a front shank unit 42 and a rear shank unit 44. Each shank unit consists of an arcuate-shaped body 46 of bar material, preferably one inch wide and two inches deep for stiffening purposes, but the body may be reinforced and stiffened by a similarly shaped strip 47 as shown in the modified form of shank body 46$^a$ shown in FIG. 9. One end 48 of each body 46 is clamped securely by a clamping lug 52 to a pivoted bearing assembly 50 including a bushing or sleeve 51 pivotally sleeved around the tubes 14 and 16 and secured thereto by a locking screw, not shown. A prong or shovel 54 is secured at one end to the other end 56 of the shank body 46 by rivets 58 and forms an extension of the body of the shank. The prong is curved in the same direction as the body 46 so as to enter the ground G in an oblique direction. The shank bodies and prongs extend in the same direction. Ordinarily such front and rear shank units are connected by a rigid lever bar. According to the present invention, however, a flexible connection is provided between the shank units 42 and 44.

The improved flexible connection between the front and rear shank units consists of a pair of spaced triangular-shaped crank arms 60 and 62 joined by a flexible chain assembly consisting of a pair of short chains 64, 64 pivotally secured at one end to pivot pins 66 fastened to the apex end of the crank arms 60 and 62 and fastened at the other end to threaded eye-bolts 68 forming the fastening and adjusting elements of a turnbuckle device 70. The turnbuckle device 70 provides means for adjusting the length of the flexible connection.

In operation, the cultivator 10 is attached to a tractor or other automotive vehicle by means of the subframe 26 and is pulled along the ground G to be tilled. The prongs 54 enter the ground in an oblique direction and assume a constant level as shown in FIG. 2, to plow a furrow. Upon striking an obstacle such as a stone S, the front shank unit 32 automatically shifts around in a clockwise direction as viewed in FIG. 2, thereby carrying the crank arm 60 around, which in turn pulls on the chain assembly which permits the crank arm 60 to swing around thereby permitting the arcuate-shaped body 46 and prong 54 to swing around and upwardly to the height of the frame as shown in FIG. 3 sufficiently high to clear the stone S. At the same time, the crank arm 62 is swung anticlockwise as shown in FIG. 2 swinging the attached shank body 46 and prong 54 in the same direction above the ground, with the end of the prong above the stone S as shown in FIG. 3. Continued forward movement of the cultivator will carry the front shank unit 42 clear and away from the stone and when released from the pressure of the stone, the front shank unit 42 will automatically become unwound and drop by gravity down to normal ground penetrating position as shown in FIG. 4, the rear shank unit 44 at this time sliding down along the stone to automatically assume its normal ground penetrating position.

Referring now to FIGS. 5 to 8, inclusive, herein a fragment of a frame of a cultivator is illustrated in the form of a rectangular wooden joint or beam 74 to which is attached a modified form of stiff shank assembly 40'. The assembly includes a shank unit 42' consisting of an arcuate-shaped body 44' of flat metal plate-like material, one end of which is fitted in and clamped to the bottom half of an elongated H-shaped bearing member 76 by means of clamp assemblies in the form of inverted U-shaped bail members 78, 78 and perforated plates 79. The bail members 78 are seated in notches 80 formed in the top elongated edges of the bearing member 76 extending downwardly over the sides of the bearing member and through the perforations in the perforated plates 79, where they are fastened by nuts 82. The arcuate-shaped body 44' of the shank projects outwardly of the outer end of the bearing member 76 and points inwardly and is formed at its free end with an arrowhead-shaped or chisel-shaped shovel or sweep 84.

An elongated sleeve or tubular bearing member 86 seats in a saddle-shaped seat 88 formed in the top half of the bearing member 76 midway its length and is spot welded thereto as indicated at 89. The sleeve 76 rigidly connects a pair of hanger devices 90. Each hanger device 90 consists of an elongated angle bar 92 having a vertically disposed leg portion 94 and a horizontally disposed leg portion 96 as viewed in FIG. 6. A length of pipe 97 is welded to the vertically disposed leg portion at one end thereof as indicated at 98, and said end is formed with a hole 99 communicating with the pipe 97. The pipes 97 extend inwardly through the ends of the sleeve bearing member 86 in opposed relation, leaving a small clearance 100 between the inner free ends thereof as seen in FIG. 6. At its inner end, each vertically disposed leg portion is cutaway and tapers toward the horizontal leg portion as indicated at 101. A rectangular shelf or platform 102 is formed integrally with this tapering edge of the vertical leg portion and projects over an adjacent end of the horizontal leg portion 96. Upstanding integral lugs 104 are formed on the top surface of the shelf or platform adjacent the corners thereof. The lugs make the hanger device fit snugly on the frame and prevent the clamps or bails from being cut off and also prevent the hanger devices from twisting. A hole 106 is formed at each end of the shelf or platform centrally thereof between the adjacent lugs 104. The shelves or platforms are rigidly fastened to the under surface of the joist or beam 74 of the cultivator frame by means of clamps in the form of inverted bail members 108, 108 sleeved around the top of the joist or beam and extending downwardly through the holes 106 in the shelves where they are secured by nuts 110 on the threaded ends thereof. An elongated headed bolt 112 extends through the pipes 97 and holes 99 of the vertically disposed leg portions 94 and a nut 114 on the threaded end thereof keeps the hanger devices 90 from spreading.

The stiff shank unit 42' may be flexibly connected to another shank unit by means of a flexible connection including a crank arm member 116 sleeved around one end of the sleeve bearing member 86 and welded thereto as indicated at 118. The crank arm member is formed with a tubular hub portion 120 at its free end through which extends a headed bolt 122 held therein by lock nut 124. One end of a chain 126 is secured to the headed end of a bolt 122, the other end of the chain being fastened to a turnbuckle device 125, which in turn is connected to another short chain (not shown) similar to chain 126 and a crank arm member (not shown) similar to clevis member 116.

The stiff shank unit 42' is adapted to hold a more uniform depth, will hold the shovel flat, makes an evener penetration and lighter craft. The shovel will wear evenly and the point will not wear round. Side play is eliminated and the shovel will not wander sidewise causing skips. When there is no side play, a narrower shovel can be used and still give a clean cut. The narrower shovels are cheaper to manufacture. While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. In a cultivator for tilling the soil, a frame, stiff dual shank assemblies rigidly attached to the front and rear of the frame, means of connection between the front and rear assemblies, each shank assembly including a pair of spaced hanger devices connected at one end to the frame, a bolt connecting the other ends of the hanger devices, a sleeve member oscillatably mounted around the bolt, and a shank unit rigidly connected at one end to said sleeve member, said unit including a shank having an arcuate-shaped body with an arrow-head-shaped shovel formed on the other end of the body, the connection between the shank unit and the sleeve consisting of an elongated bearing member H-shaped in cross-section, said bearing member having a saddle seat receiving the sleeve thereacross, means for fastening the sleeve in the seat, and clamping assemblies around each end of the bearing member and end of the shank.

2. In a cultivator for tilling the soil, a frame, stiff dual shank assemblies rigidly attached to the front and rear of the frame, means of connection between the front and rear assemblies, each shank assembly including a pair of spaced hanger devices connected at one end to the frame, a bolt connecting the other ends of the hanger devices, a sleeve member oscillatably mounted around the bolt, and a shank unit rigidly connected at one end to said sleeve member, said unit including a shank having an arcuate-shaped body with an arrow-head-shaped shovel formed on the other end of the body, the connection between the shank unit and the sleeve consisting of an elongated bearing member H-shaped in cross-section, said bearing member having a saddle seat receiving the sleeve thereacross, means for fastening the sleeve in the seat, and clamping assemblies around each end of the bearing member and end of the shank, said clamping assemblies each comprising an inverted U-shaped bail around the top and sides of the bearing member, perforated plates across the bearing member at the ends thereof receiving the ends of the bails and nuts on the ends of the bails, protruding through the perforations in the plates.

3. In a cultivator for tilling the soil, a frame, stiff dual shank assemblies rigidly attached to the front and rear of the frame, means of connection between the front and rear assemblies, each shank assembly including a pair of spaced hanger devices connected at one end to the frame, a bolt connecting the other ends of the hanger devices, a sleeve member oscillatably mounted around the bolt, and a shank unit rigidly connected at one end to said sleeve member, said unit including a shank having an arcuate-shaped body with an arrow-head-shaped shovel formed on the other end of the body, the connection between the hanger devices and the frame consisting of platforms on the end of the hangers containing a portion of the frame, said platforms having holes in the ends thereof, inverted U-shaped bails sleeved around the portion of the frame and depending through the holes in the ends of the platforms and nuts on the ends of the bails below the platforms, the connection between the shank unit and the sleeve consisting of an elongated bearing member H-shaped in cross-section, said bearing member having a saddle seat receiving the sleeve thereacross, means for fastening the sleeve in the seat, and clamping assemblies around each end of the bearing member and end of the shank.

4. In a cultivator for tilling the soil, a frame, stiff dual shank assemblies rigidly attached to the front and rear of the frame, means of connection between the front and rear assemblies, each shank assembly including a pair of spaced hanger devices connected at one end to the frame, a bolt connecting the other ends of the hanger devices, a sleeve member oscillatably mounted around the bolt, and a shank unit rigidly connected at one end to said sleeve member, said unit including a shank having an arcuate-shaped body with an arrow-head-shaped shovel formed on the other end of the body, the connection between the hanger devices and the frame consisting of platforms on the end of the hangers containing a portion of the frame, said platforms having holes in the ends thereof, inverted U-shaped bails sleeved around the portion of the frame and depending through the holes in the ends of the platforms and nuts on the ends of the bails below the platforms, the connection between the shank unit and the sleeve consisting of an elongated bearing member H-shaped in cross-section, said bearing member having a saddle seat receiving the sleeve thereacross, means for fastening the sleeve in the seat, and clamping assemblies around each end of the bearing member and end of the shank, said clamping assemblies each comprising an inverted U-shaped bail around the top and sides of the bearing member, perforated plates across the bearing member at the ends thereof receiving the ends of the bails and nut on the ends of the bails protruding through the perforations in the plates.

References Cited

UNITED STATES PATENTS

| | | | |
|---|---|---|---|
| 1,867,521 | 7/1932 | Mote | 172—657 |
| 2,712,780 | 7/1955 | Graham | 172—657 |
| 2,925,132 | 2/1960 | Kuhlman | 172—646 X |
| 2,943,692 | 7/1960 | Hyland et al. | 172—657 |
| 3,266,579 | 8/1966 | Hofer | 172—657 X |

FOREIGN PATENTS 606,637   3/1926   France.

ABRAHAM G. STONE, *Primary Examiner.*

ANTONIO F. GUIDA, *Examiner.*

R. CARTER, *Assistant Examiner.*